United States Patent
Chu et al.

(10) Patent No.: US 7,420,175 B2
(45) Date of Patent: Sep. 2, 2008

(54) EXPLOSIVES DETECTION BY DIRECTIONAL FAST NEUTRON BEAMS SCAN WITH ASSOCIATED PARTICLES

(75) Inventors: Wei-Kan Chu, Pearland, TX (US); Jiarui Lui, Pearland, TX (US)

(73) Assignee: University of Houston, Houston, TX (US)

( * ) Notice: Subject to any disclaimer, the term of this patent is extended or adjusted under 35 U.S.C. 154(b) by 35 days.

(21) Appl. No.: 11/279,625

(22) Filed: Apr. 13, 2006

(65) Prior Publication Data
US 2007/0241283 A1   Oct. 18, 2007

Related U.S. Application Data

(60) Provisional application No. 60/670,891, filed on Apr. 13, 2005.

(51) Int. Cl.
*G01N 23/222* (2006.01)
(52) U.S. Cl. .................... 250/358.1; 376/159
(58) Field of Classification Search ................. 376/156, 376/158, 159; 250/358.1
See application file for complete search history.

(56) References Cited

U.S. PATENT DOCUMENTS 5,076,993 A * 12/1991 Sawa et al. ................. 376/159
2003/0165212 A1 * 9/2003 Maglich ..................... 376/156

* cited by examiner

*Primary Examiner*—Constantine Hannaher
(74) *Attorney, Agent, or Firm*—Akin Gump Strauss Hauer & Feld LLP

(57) ABSTRACT

This invention is related to equipment and techniques for fast neutron activation analysis of explosives and /or other warfare agent. The techniques are based on 14 MeV fast neutrons from D-T fusion reaction, the kinematics of the nuclear reaction and fast coincidence between $\alpha$-particles of the D-T reaction and $\gamma$-quanta from fast neutron induced reactions. A fast neutron generator with effective target cooling and different operation modes provides high neutron yield, long life, and simple maintenance of the equipment and good geometric resolution of the directional neutron beam. High positional resolution of the directionally scanning neutron beam, high time resolution of the coincidence and high neutron yield provide the real time robust screen of explosives with high speed and/or high sensitivity, flexibility for big and small items and overall high probability of detection (PD) and low probability of false alarms (PFA). The remote video scan device also has zooming capability to change solid angle.

39 Claims, 5 Drawing Sheets

EXPLOSIVES DETECTION BY DIRECTIONAL FAST NEUTRON BEAMS SCAN WITH ASSOCIATED PARTICLES

CROSS-REFERENCE TO RELATED APPLICATIONS

This application claims priority to U.S. provisional patent application No. 60/670,891, filed on Apr. 12, 2005 which is incorporated by reference herein.

STATEMENTS REGARDING FEDERALLY SPONSORED RESEARCH OR DEVELOPMENT

None.

REFERENCE TO A MICROFICHE APPENDIX

None.

BACKGROUND OF THE INVENTION

This invention relates to explosives detection by directional fast neutron beams scan with associated particles.

Existing means of inspection, such as X-ray screening and trace/vapor sensing are very deficient for detecting explosive substances. The former attempts to detect the explosives in the inspected items by looking at the shapes of the item. The latter attempts to collect traces or vapor from the outside of the inspected item. Both of these inspections techniques provide information that may or may not be related to the presence of explosives' inside the item.

Nuclear techniques, such as neutron-neutron, neutron-gamma and gamma-gamma, may detect explosives automatically through detection of its elemental constituents, primarily nitrogen and secondarily hydrogen. Due to the long penetration depth of neutrons (thermal and fast) and gamma ray, these nuclear techniques can provide the explosives elemental constituent's information deep inside the inspected items.

In neutron-based techniques, fast or thermal neutron induced (n, n gamma) reactions may provide information about the elemental composition in the depth of an inspected item. A fast neutron technique using "tagged neutrons" from a sealed neutron tube has recently been developed. This technique is promising. However, the usefulness of the technique is questionable because its sensitivity is low due to its use of a sealed neutron tube. As such, methods of detecting explosives in items are still needed that are more accurate and effective.

BRIEF SUMMARY OF THE INVENTION

In one aspect to the invention, a method for detection of an explosive associated with an inspected item is provided. The method includes distributing fast neutrons about the item, wherein $\alpha$-particles are produced during fast generation of the neutrons from a Dueterium ion current reaction, detecting gamma radiation resulting from the distribution of neutrons about the item using a coincidence measurement of the $\alpha$-particles produced during generation of the neutron and gamma-quanta from (n, gamma) reaction, producing a gamma-spectra analysis using a coincidence measurement and analyzing the gamma spectra analysis to detect an explosive material associated with the item.

In another embodiment of the invention, a method for detecting an explosive associated with an inspected item is provided that includes distributing fast neutrons about the item, wherein $\alpha$-particles are produced during fast generation of the neutrons from a 150 kV neutron generator with a high Dueterium ion current, detecting gamma radiation resulting from the distribution of neutrons about the item using a coincidence of the $\alpha$-particles produced during the generation of the neutrons and gamma-quanta (n, gamma) reaction by detecting gamma radiation within a cross-section of the directional neutron beam and within the distance between the neutron source and the item and suppressing background gamma radiation by pointing a directional neutron beam in a single direction toward the item only and detecting the gamma radiation in the single time-window direction only. Gamma-spectra analysis is then produced using the coincidence measurement, which is then analyzed to detect an explosive material associated with the item. At least one of a two-dimensional or three-dimensional shape or size of the explosive is then displayed in the real time.

In yet another embodiment of the invention an apparatus for detecting an explosive associated with an item is provided that comprises a gamma-detector, a delay coincidence module in operable contact with the gamma detector, a neutron source, an $\alpha$ detector in operable contact with the gamma detector and a display.

DETAILED DESCRIPTION OF THE INVENTION

Figure 1:
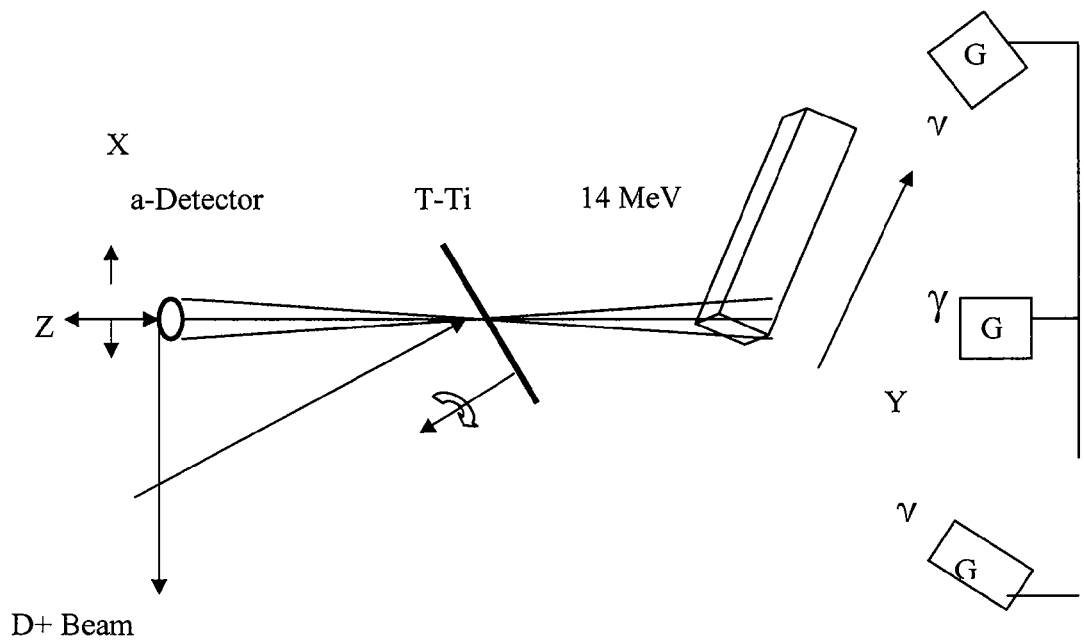
FIG. 1 illustrates a basic set-up of the explosives detection of the invention by directional fast neutron beam scan with associated particles.
Figure 1:
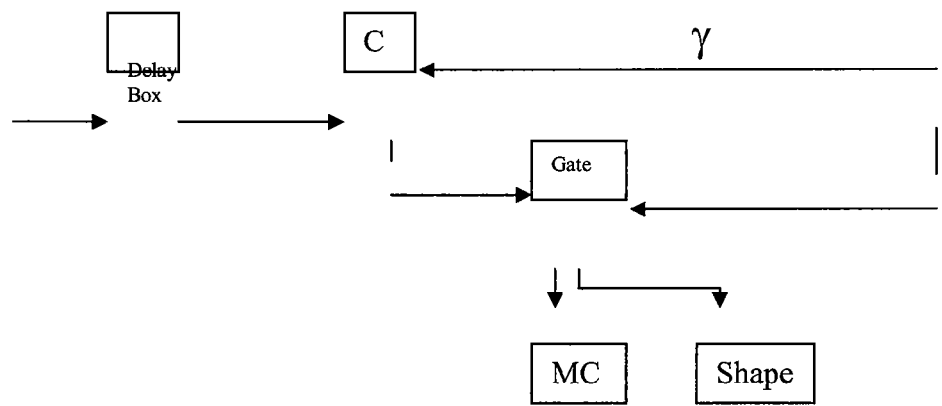
Figure 2:
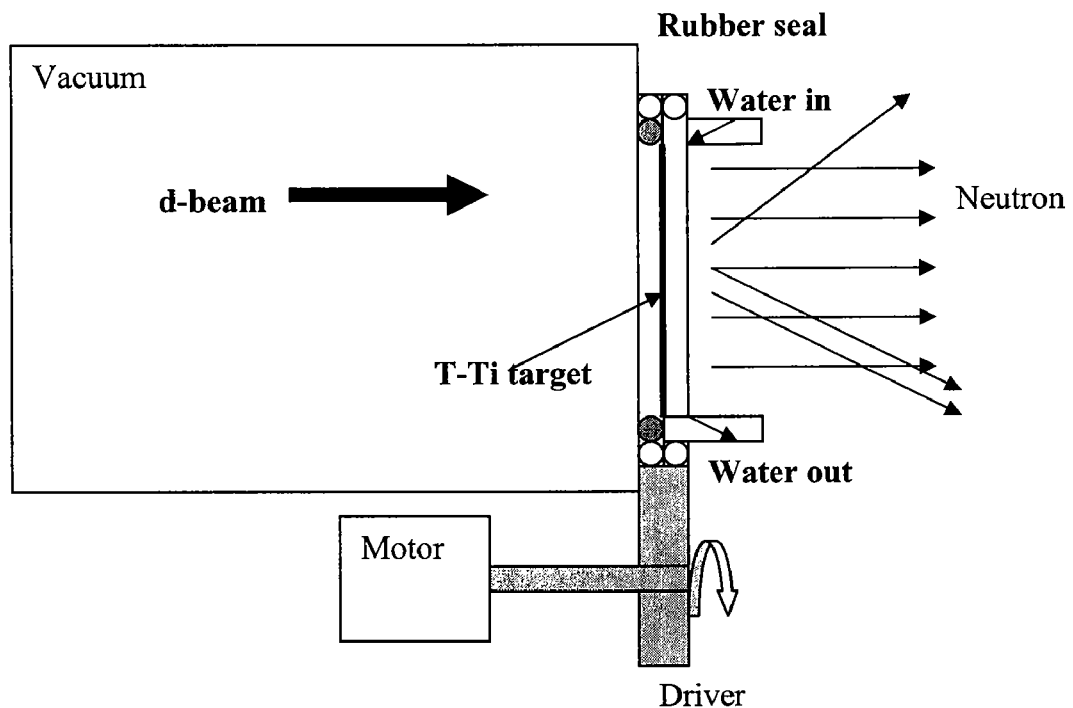
FIG. 2 illustrates the neutron source with rotating T-Ti target, d-beam scan and direct water-cooling.
Figure 3:
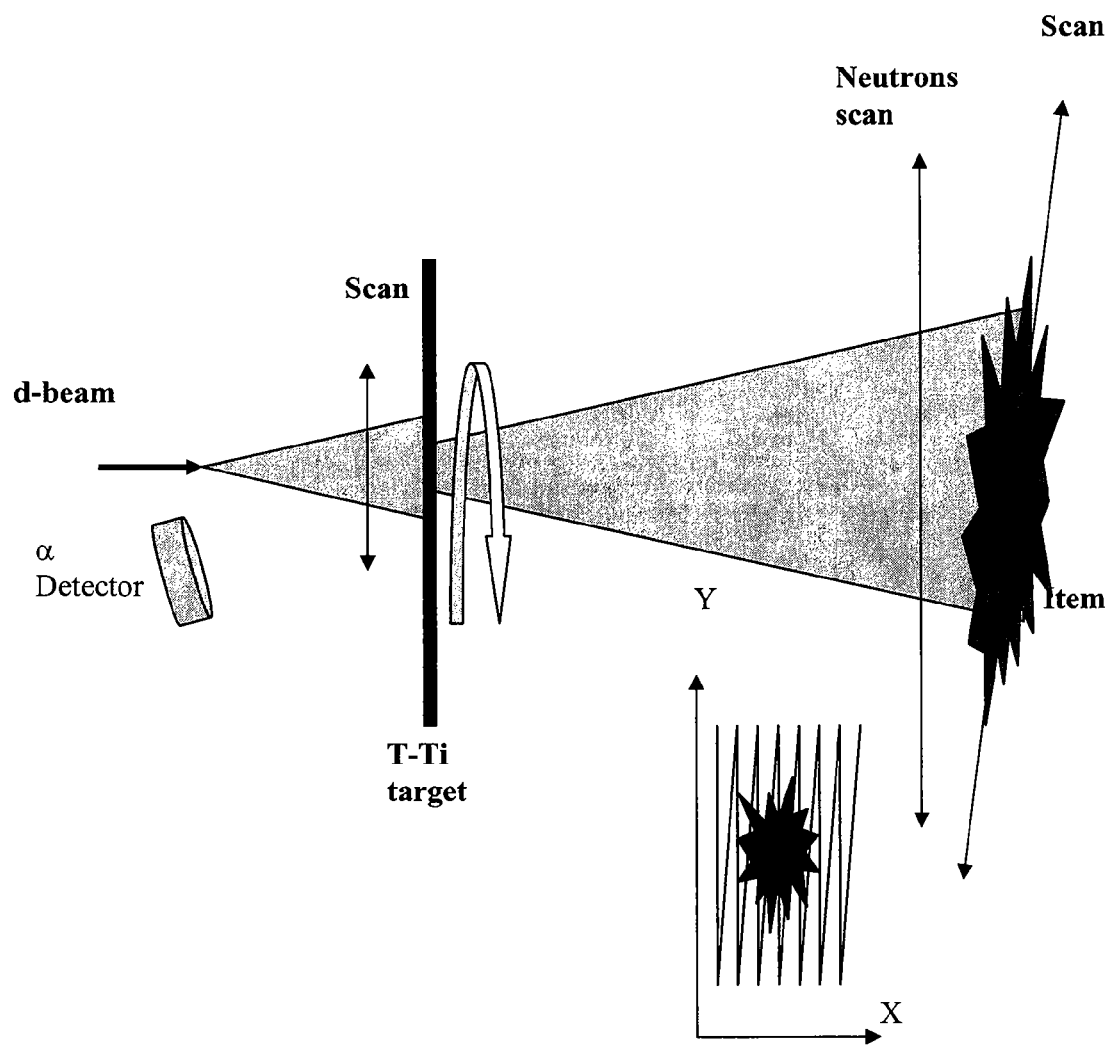
FIG. 3 illustrates one embodiment of the invention utilizing a one-dimensional scan of d-beam or gamma detector and one-dimensional translation movement of the inspected item. The gamma-spectra are detected by gamma detector G
Figure 4:
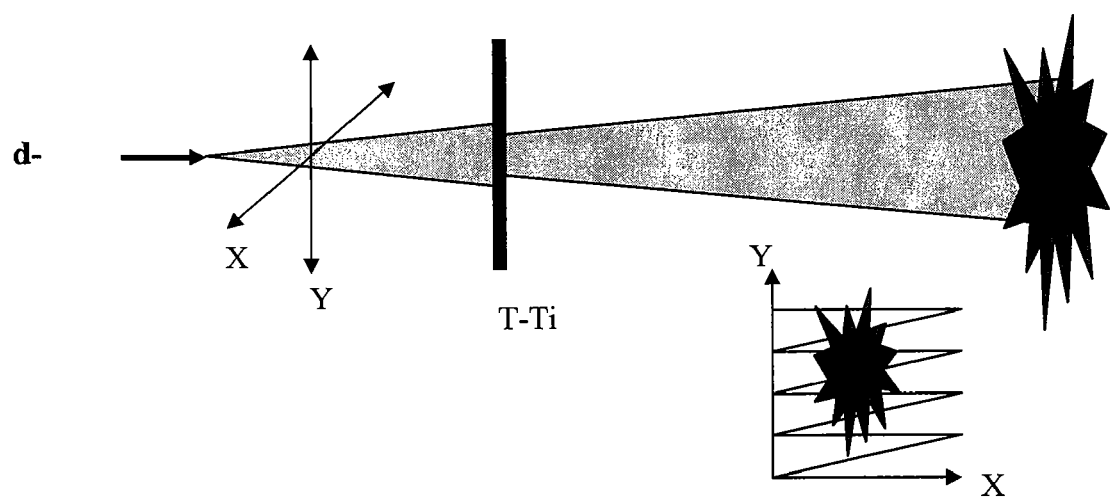
FIG. 4 illustrates one embodiment of the invention comprising a two-dimensional scan of d-beam or d-detector and a static item.
Figure 5:
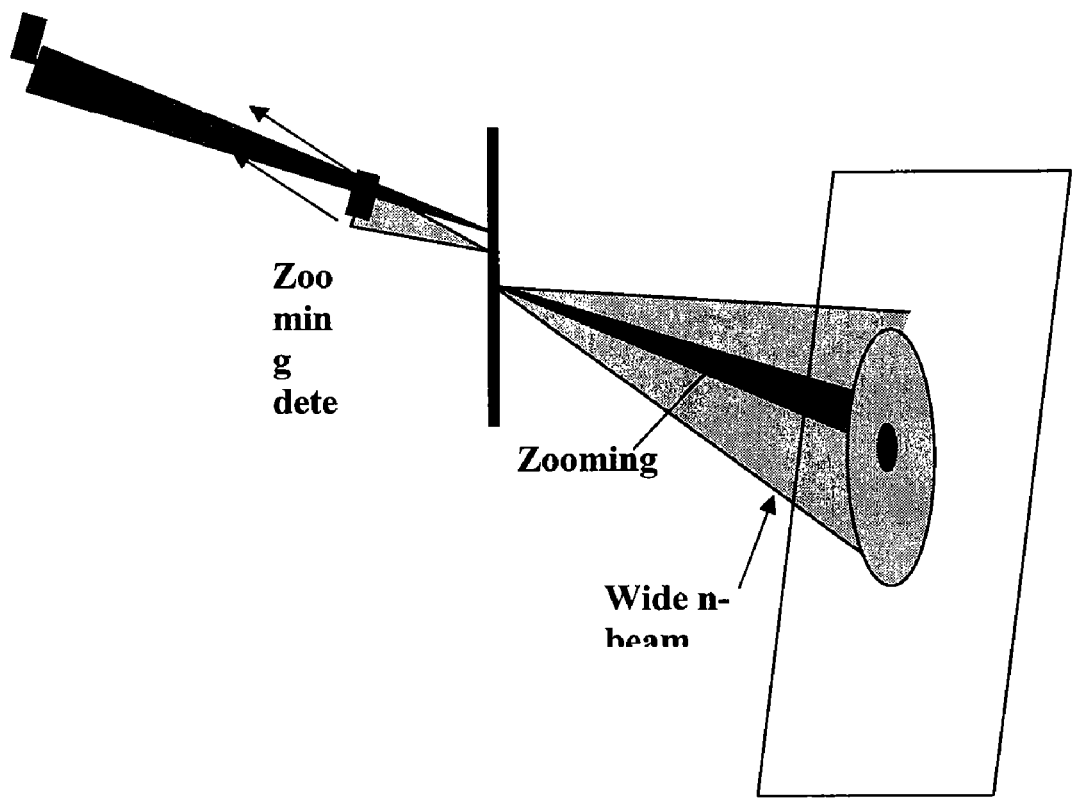
FIG. 5 illustrates a zooming model of directional neutron probing with one-dimensional movement of $\alpha$-detector along Z-direction.

The technique of the invention uses a nuclear reaction similar to the "tagged neutron" method that has recently been developed, but with several novel distinctions. These novel distinctions improve the sensitivity for detecting explosives by one to two orders of magnitude, while providing image information, to enable the real time investigation.

This invention provides a highly sensitive and direct manner for using fast neutrons to look inside of a container, a piece of luggage, a cargo truck, or any other inspected item to determine the elemental ratio of scanned items. Once such an elements ratio is known, the detection of particular explosive is readily accomplished, as all explosives contain specific chemical elements in identifiable proportions and densities. The detection of explosives is achieved by detection and analysis of gamma-spectra from the neutron induced nuclear reactions.

Unlike neutron activation analysis techniques, in which gamma-spectra due to the thermal or fast neutrons induced nuclear reactions are directly analyzed to provide the chemical elements abundance, the present invention uses a coincidence measurement of alpha-particles produced during fast neutron generation from a D-T (T(d,n) $\alpha$ reaction with deuterium ion beam) reaction, to the $\gamma$-quanta generated by fast neutrons. This coincidence gives a highly directional and "collimated" beam of 14 MeV fast neutrons to sequentially "probe" small volumes of the inspected item with high space resolution. In this manner, the present inspection equipment and methods are able to inspect right through into a particular voxel and directly determine what chemicals are present therein, based on the gamma-spectra analysis. By looking in a rapid, controlled sequence into a sufficient number of voxels by a directional fast neutron beam scan, direct images of detected chemicals are presented. In a specific embodiment of the invention, moving the α-particle detector allows the equivalent inspection of small hidden explosives parking within a small volume.

The fast and highly sensitive detection of explosives and other objects in an inspected item is realized due to the present methods and apparatuses. The high neutron yield is achieved due to well focused high current deuterium ion beam (d-beam). The well focused high current d-beam can be realized in the neutron generator with a well cooled T-target and a much reduced average power density. As used herein, the term or phrase "T-target" means a rotating Tritium-Ti target with water-cooling used for high d-beam current up to several mA. As used herein, the term or phrase "d-beam" means a Deutrium-ion beam from a powerful ion source accelerated to 150 keV to cover the strong 96 keV resonance of the D-T reaction for an intense neutron source. A reduced average power density at the T-target is also realized by the various embodiments of the present invention, utilizing different modes of d-beam bombarding. A dramatic reduction of the γ-background by the fast coincidence between α-particles and γ-quanta is also achieved by the current invention.

The combination of these arts of nuclear techniques provides high geometrical resolution of the directionally scanning neutron beam, high time resolution of the coincidence and high neutron yield. All these features of the invention result in making high speed explosive detection with high sensitivity, flexibility for big and small items and overall high probability of detection (PD) and low probability of false alarms (PFA).

The methods and apparatuses of the invention are capable of package scanning and detecting TNT, as well as other explosive substances containing Nitrogen. These systems and methods are capable of high-sensitivity, two-dimensional or three-dimensional imaging to give the shape of an explosive containing package in real time.

Nuclear techniques, such as neutron-neutron, neutron-gamma and gamma-gamma, may detect explosives automatically through its elemental constituents, primarily nitrogen and secondarily hydrogen. Due to the long penetration depth of neutrons (thermal and fast) and gamma ray, these nuclear techniques can provide the explosives elemental constituent's information deep inside the inspected items. In neutron-based techniques, fast neutron or thermal neutron induced (n, gamma) or (n, n gamma) reactions may provide information about the elemental composition within the depth of the item. Among the fast neutron techniques used, during last few years, the "tagged neutrons" technique, which utilizes a sealed neutron tube, has been promising. Again, this technique, which is still under development, is not ideal due to its low sensitivity.

The methods of the invention are based on the same nuclear reaction, but comprise several novel distinctions, which improve the sensitivity of the detection by one to two orders of magnitude. The invention comprises providing image information to enable the real-time investigation of an item's contents. Distinguishing features of the present invention further include high neutron yield, which results in high speed or high sensitivity, long life-time and easier maintenance of the neutron generator. In addition, the methods and apparatus of the invention produce a high signal/noise ratio due to fast, sub-nanosecond delayed (alpha, gamma) coincidence.

In one embodiment of the invention, a two-dimensional picture of the item with neutron beam scan is produced. In another embodiment of the invention, a three-dimensional picture is produced by neutron beam scan and fast coincidence. In another embodiment of the invention, the suspected subject inside the inspected item is checked quickly by zooming at enhanced sensitivity.

In another embodiment of the invention, the flexible three-dimensional scan and zooming is employed for big and small items. For larger items, the α-particle detector is moved back, further away from the item. With smaller items, the α-particle detector is moved closer to the item. This is done to change the solid angle of the α-detector in the zooming mode.

The present invention will not be explained in more detail by way of the following illustrative example. It should be noted that the invention is not limited to the following example. Any person of ordinary skill in the art could modify the teachings of the example and of the description, generally, without departing from the spirit and scope of the invention.

EXAMPLE

With reference to FIG. 1, a fast $BaF_2$ scintillation gamma detector can detect the 4.44 MeV gamma quanta from this specific (n, gamma) reaction on nitrogen. As used herein, the term or phrase "gamma detector" means the detector of gamma ray from the neutron-induced reaction in the object is detected by the gamma detector G (BaF2 scintillator). The 14 MeV neutrons from the neutron source are distributed in all directions and the 4.44 MeV gamma from all surrounding objects will be detected as a huge background.

To suppress the huge gamma background, a directional neutron beam is used, pointing to the inspected item only. This directional neutron beam can be defined by the associated alpha particles according to the (D-T) reaction kinematics. An alpha-detector is placed in the back of the T-target with a certain solid angle for the associated alpha-particles detection. As used herein, the term or phrase "alpha-detector" means a fast scintillation detector for alpha particles with a disk shape scintillator or a multi-detector array is located in the back of the T-target. (YAP(Ce) scintillator). The directional neutron beam defined by the disk or multi-detector array scintillation detector, according to the reaction kinematics, is in the forward direction with a fan shape cross section. A corresponding neutron beam in the forward direction will be defined according to the (D-T) reaction kinematics. The directional neutron beam is shot into the direction of the inspected item, so the 4.44 MeV gamma radiation will be detected from the objects along this specific direction only with perfect background suppression.

Next, an adjustable delay fast coincidence is used. The flight time window is selected between the associated α-particles and neutron-induced gamma quanta within the depth of the inspected item. Let this fast coincidence signal trigger a gate for the 4.44 MeV gamma spectrum analyzer. In this way, the gamma ray within the cross section of the directional neutron beam (direction window) and within the distance from source-item—front to source—item back (neutron time of flight window or distance window between neutron source and the inspected item) can be detected. Background outside these two windows thereby is suppressed. The suppression of the background depends on the geometrical resolution of the directional neutron beam and the time resolution of the delayed coincidence. After background deduction, the gamma spectrum will provide elemental information in the inspected item, which is used to determine whether the item has explosive materials inside.

A 150 kV neutron generator with high d-beam current for 14 MeV neutrons from D-T reaction was utilized in accordance with the invention. The neutron flux is higher than currently used sealed neutron-tube by 1 to 2 orders of magnitudes. This will surprisingly increase the detection sensitivity by 1 to 2 orders of magnitude.

In one embodiment of the invention, the size of the inspected area may be adjusted. The cross section of the directional neutron beam can be adjusted by moving the alpha detector forward and backward with a stepping motor to change the solid angle of the alpha detector. This "zooming effect" can be realized in the large D-T reaction chamber, but not in a sealed neutron tube. As such, the claimed methods and apparatuses to not utilize a sealed neutron tube.

In another embodiment of the invention, object size and shape is delivered by the one-dimensional scan (up and down-scan) of the alpha-detector in combination with the translation movement (horizontal-direction) of the item being inspected. This feature can be realized due to the high neutron flux and the space in the D-T reaction chamber.

In an alternative embodiment of the invention, object size and shape is delivered by a multi-detector array of alpha particles or d-beam scan. The multi-detector array of alpha particles will define a multi-neutron beam with directions. In delay coincidence with gamma signals, the size and the shape of the inspected item can be obtained. As used herein, the phrase "delay coincidence" means the fast delay coincidence module with the nano-second time resolution that delivers coincidence signals between alpha detector A and gamma detector G This signal opens the gate for gamma spectrum collection.

In light of this disclosure, modification of the described examples, as well as other examples, are all within the scope of the present invention as defined by the claims that follow.

We claim:

1. A method for detecting an explosive associated with an inspected item, the method comprising the steps of:
   distributing fast neutrons from a neutron source about the item, wherein α-particles are produced during fast generation of the neutrons from a Deuterium ion current reaction;
   detecting gamma radiation resulting from the distribution of neutrons about the item using a coincidence measurement of the α-particles produced during generation of the neutrons and gamma-quanta from (n, gamma) reaction;
   adjusting the size of a scan area of the item that is being inspected,
      wherein adjusting the size of the scan area of the item being inspected comprises adjusting the cross-section of a directional neutron beam by moving an α-particle detector to change the solid angle of the α-particle detector in a zooming mode;
   producing a gamma-spectra analysis using the coincidence measurement; and
   analyzing the gamma-spectra analysis to detect an explosive material associated with the item.

2. The method of claim 1 further comprising the step of suppressing background gamma radiation.

3. The method of claim 2 wherein the step of suppressing background gamma radiation comprises pointing a directional neutron beam in a single direction toward the item only and detecting the gamma radiation in the single direction only.

4. The method of claim 1 further comprising the step of registering the gamma radiation.

5. The method of claim 4 wherein the step of registering the gamma radiation comprises using an adjustable delay fast coincidence to register the gamma radiation.

6. The method of claim 5 wherein the step of using an adjustable delay fast coincidence comprises the step of selecting a flight time window between associated α-particle and neutron-induced gamma quanta within the depth of the item and triggering a gate for the gamma registration.

7. The method of claim 1 further comprising the step of displaying a two-dimensional image of the shape of an explosive in real time.

8. The method of claim 1 wherein the step of detecting gamma radiation comprises using a $BaF_2$ scintillation gamma detector to detect the gamma radiation.

9. The method of claim 1 wherein the step of detecting gamma radiation comprises placing a gamma radiation detector in the back of the item at an angle capable of allowing the gamma radiation to be detected.

10. The method of claim 1 wherein detecting gamma radiation comprises detecting gamma radiation within a cross section of the directional neutron beam and within the distance between the neutron source and the item.

11. The method of claim 10 further comprising suppressing background gamma.

12. The method of claim 1 wherein the neutrons are generated by a 150 kV neutron generator with a high Deuterium ion current.

13. The method of claim 1 wherein the gamma α-particle detector is moved with a stepping motor backward and forward.

14. The method of claim 1 wherein adjusting the size of the inspected area of the item comprises adjusting the size of the inspected area of the item in a reaction chamber.

15. The method of claim 1 further comprising displaying a size and/or shape of an explosive associated with the item.

16. The method of claim 15 wherein displaying a size and/or shape of an explosive item comprises detecting the gamma radiation using a one-dimensional scan in combination with translational movement of the item.

17. The method of claim 15 wherein displaying a size and/or shape of an explosive item comprises using a multi-detector array of alpha particles or d-beam scan.

18. The method of claim 1 comprising the step of displaying a three-dimensional image of the shape of an explosive item in real time.

19. A method for detecting an explosive associated with an inspected item, the method comprising the steps of:
   distributing fast neutrons about the item, wherein α-particles are produced during fast generation of the neutrons from a Deuterium ion current reaction;
   detecting gamma radiation resulting from the distribution of neutrons about the item using a coincidence measurement of the α-particles produced during generation of the neutrons and gamma-quanta from (n, gamma) reaction;
   adjusting the size of a scan area of the item that is being inspected,
      wherein adjusting the size of the scan area of the item being inspected comprises adjusting the cross-section of a directional neutron beam by moving a α-particle detector to change the solid angle of the α-particle detector in a zooming mode;
   suppressing background gamma radiation;
   producing a gamma-spectra analysis using the coincidence measurement;
   analyzing the gamma-spectra analysis to detect an explosive material associated with the item; and
   displaying a shape or size of the explosive in real time.

20. A method for detecting an explosive associated with an inspected item, the method comprising the steps of:

distributing fast neutrons about the item, wherein α-particles are produced during fast generation of the neutrons from a 150 kV neutron generator with a high Deuterium ion current;

detecting gamma radiation resulting from the distribution of neutrons about the item using a coincidence measurement of the α-particles produced during generation of the neutrons and gamma-quanta from (n, gamma) reaction by detecting gamma radiation within a cross-section of the directional neutron beam and within the distance between the neutron source and the item;

adjusting the size of a scan area of the item that is being inspected,
  wherein adjusting the size of the scan area of the item being inspected comprises adjusting the cross-section of a directional neutron beam by moving a α-particle detector to change the solid angle of the α-particle detector in a zooming mode;

suppressing background gamma radiation by pointing a directional neutron beam in a single direction toward the item only and detecting the gamma radiation in the singe time-window direction only;

producing a gamma-spectra analysis using the coincidence measurement;

analyzing the gamma-spectra analysis to detect an explosive material associated with the item; and displaying at least one of a two-dimensional image of a shape or size of the explosive in real time or a three-dimensional image of a shape or size of the explosive.

21. An apparatus for detecting an explosive associated with an item comprising:
  a gamma detector;
  a delay coincidence module in operable contact with the gamma detector;
  a neutron source, wherein the neutron source contains a target;
  an alpha detector in operable contact with the gamma detector, wherein the alpha detector is positionable at a variable distance from the target; and
  a display.

22. A method for detecting an explosive associated with an inspected item, the method comprising the steps of:
  distributing fast neutrons from a directional neutron source about the item, wherein α-particles are produced during fast generation of the neutrons from a Deuterium ion current reaction;
  detecting gamma radiation resulting from the distribution of neutrons about the item using a coincidence measurement of the α-particles produced during generation of the neutrons and gamma-quanta from (n, gamma) reaction;
  suppressing background gamma radiation,
    wherein suppressing background gamma radiation comprises pointing a directional neutron beam in a single direction toward the item only and detecting the gamma radiation in the single direction only;
  scanning the item,
    wherein scanning comprises adjusting the position of an α-particle detector relative to a target within the neutron source;
  producing a gamma-spectra analysis using the coincidence measurement; and
  analyzing the gamma-spectra analysis to detect an explosive material associated with the item.

23. The method of claim 22 further comprising the step of registering the gamma radiation.

24. The method of claim 23 wherein the step of registering the gamma radiation comprises using an adjustable delay fast coincidence to register the gamma radiation.

25. The method of claim 24 wherein the step of using an adjustable delay fast coincidence comprises the step of selecting a flight time window between associated α-particle and neutron-induced gamma quanta within the depth of the item and triggering a gate for the gamma registration.

26. The method of claim 22 further comprising the step of displaying a two-dimensional image of the shape of an explosive in real time.

27. The method of claim 22 wherein the step of detecting gamma radiation comprises using a $BaF_2$ scintillation gamma detector to detect the gamma radiation.

28. The method of claim 22 wherein the step of detecting gamma radiation comprises placing a gamma radiation detector in the back of the item at an angle capable of allowing the gamma radiation to be detected.

29. The method of claim 22 wherein detecting gamma radiation comprises detecting gamma radiation within a cross section of the directional neutron beam and within the distance between the neutron source and the item.

30. The method of claim 29 further comprising suppressing background gamma radiation.

31. The method of claim 22 wherein the neutrons are generated by a 150 kV neutron generator with a high Deuterium ion current.

32. The method of claim 22 further comprising adjusting the size of an area of the item that is being inspected.

33. The method of claim 32 wherein adjusting the size of the area of the item being inspected comprises adjusting the cross-section of the directional neutron beam by moving the α-particle detector to change the solid angle of the α-particle detector in the zooming mode.

34. The method of claim 33 wherein the α-particle detector is moved with a stepping motor backward and forward.

35. The method of claim 32 wherein adjusting the size of the inspected area of the item comprises adjusting the size of the inspected area of the item in a reaction chamber.

36. The method of claim 22 further comprising displaying a size and/or shape of an explosive associated with the item.

37. The method of claim 36 wherein displaying a size and/or shape of an explosive item comprises detecting the gamma radiation using a one-dimensional scan in combination with translational movement of the item.

38. The method of claim 36 wherein displaying a size and/or shape of an explosive item comprises using a multi-detector array of alpha particles or d-beam scan.

39. The method of claim 22 comprising the step of displaying a three-dimensional image of the shape of an explosive item in real time.

* * * * *

UNITED STATES PATENT AND TRADEMARK OFFICE
CERTIFICATE OF CORRECTION

| | | |
|---|---|---|
| PATENT NO. | : 7,420,175 B2 | Page 1 of 1 |
| APPLICATION NO. | : 11/279625 | |
| DATED | : September 2, 2008 | |
| INVENTOR(S) | : Wei-Kan Chu and Jiarui Liu | |

It is certified that error appears in the above-identified patent and that said Letters Patent is hereby corrected as shown below:

On the title page, item [75] the inventor's name "Jiarui Lui" should read --Jiarui Liu--.

Signed and Sealed this

Eleventh Day of November, 2008

JON W. DUDAS
*Director of the United States Patent and Trademark Office*